No. 876,064. PATENTED JAN. 7, 1908.
F. E. KINSMAN.
SINGLE TRACK SIGNALING AND TRAIN CONTROLLING SYSTEM FOR RAILWAYS.
APPLICATION FILED OCT. 10, 1905.
3 SHEETS—SHEET 1.
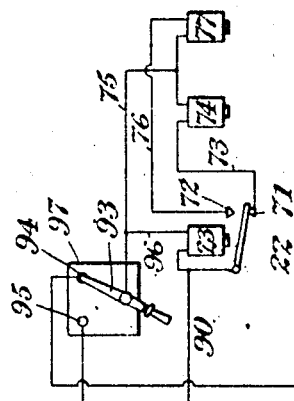
Witnesses:
Inventor:
Frank E. Kinsman
by
Atty.

No. 876,064. PATENTED JAN. 7, 1908.
F. E. KINSMAN.
SINGLE TRACK SIGNALING AND TRAIN CONTROLLING SYSTEM FOR RAILWAYS.
APPLICATION FILED OCT. 10, 1906.
3 SHEETS—SHEET 4.
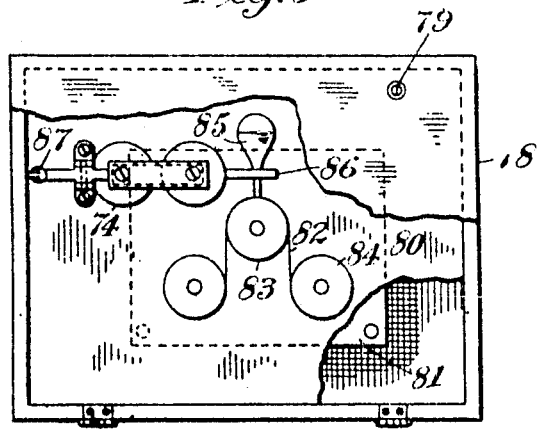
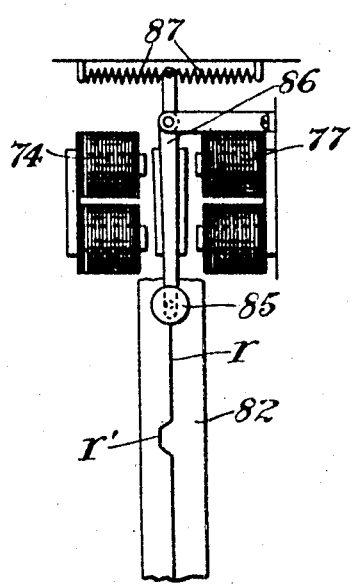 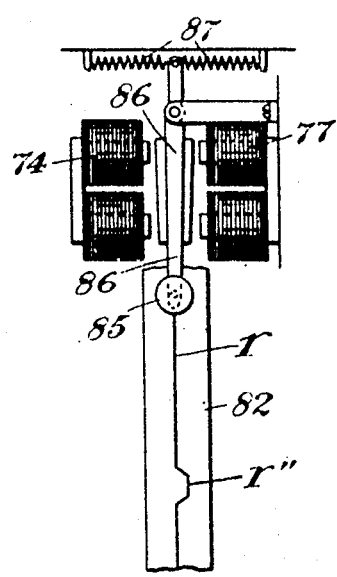
Witnesses:
Inventor:
Frank E. Kinsman
by
Atty.

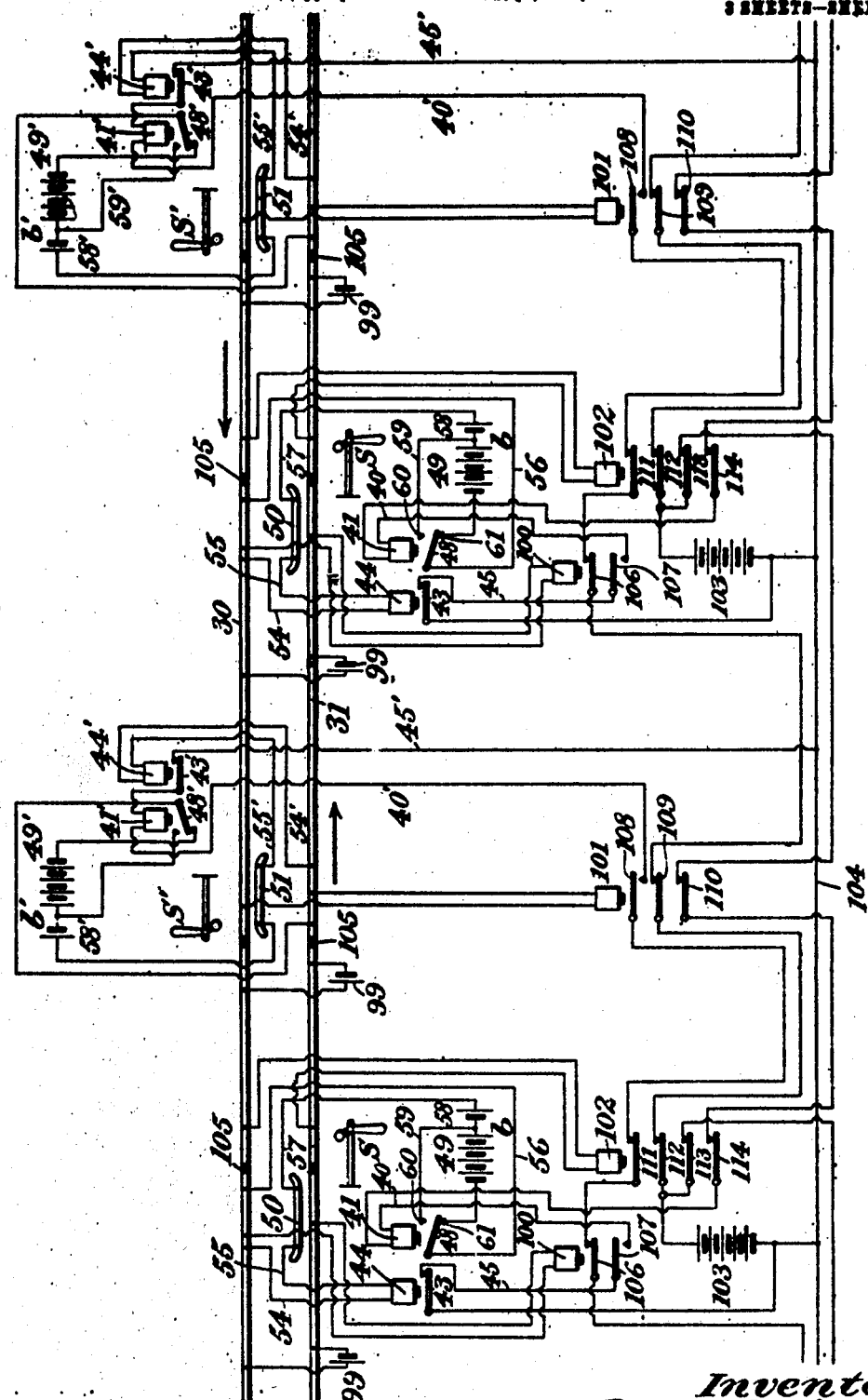

UNITED STATES PATENT OFFICE.

FRANK E. KINSMAN, OF PLAINFIELD, NEW JERSEY.

SINGLE-TRACK SIGNALING AND TRAIN-CONTROLLING SYSTEM FOR RAILWAYS.

No. 876,064.

Specification of Letters Patent.

Patented Jan. 7, 1908.

Application filed October 10, 1905. Serial No. 282,121.

*To all whom it may concern:*

Be it known that I, FRANK E. KINSMAN, a citizen of the United States, and a resident of Plainfield, in the county of Union and State of New Jersey, have invented certain new and useful Improvements in Single-Track Signaling and Train-Controlling Systems for Railways, of which the following is a specification.

This invention relates to a single-track signaling and train-controlling system for railways, and especially to a system for automatically controlling and stopping a vehicle moving in either direction on a line of way or railway when there is a danger condition ahead of the same, the present invention being in the nature of an improvement upon the automatic train-stopping system disclosed in prior patents granted to me.

The principal object of this invention is to provide a controlling apparatus or system adapted particularly for use on single-track roads and capable of stopping a train or vehicle when there is a danger condition ahead of the same, whether the train is running in one or the other direction on such track.

In order to accomplish the desired result I prefer to combine a controlling or train-stopping apparatus, which may be of the general type disclosed in my aforesaid patents, with a block-signal system in such a manner that at least one of these two main controlling means, and preferably both of them, will be governed by the other and will indicate a danger condition whenever the other does so. Thus, whenever a danger condition is present in and is indicated by either the automatic controlling means for stopping the movement of a vehicle or train or by train-signaling means such as a block signal system, such danger condition will be indicated in such other means or system and will serve to put such other means or system in the same condition as the first. The various parts of the automatic train-controlling or train-stopping system and of the train-signaling or block-signal system, should be so combined as to coöperate properly with each other and with a moving vehicle or train for either direction of travel of such train, that is to say, they should be so combined that if a vehicle is moving in one direction along the track a danger condition will be indicated ahead of the vehicle at a given point, while if a vehicle or train is moving in the other direction a danger condition ahead of it will be indicated at a different point in the track. This is particularly important when the track is divided into blocks and protected by a single-track block-signal system having semaphores or similar signals at opposite ends of each block, and usually at different sides of the track, corresponding to and controlling different directions of running. In such a case the automatic train-controlling or train-stopping means should be so combined with the block-signals that one train-stopping device will coöperate with one semaphore or equivalent signal at one end of a block, and another train-stopping device will coöperate with another semaphore or equivalent signal at the other end of such block and will govern the operation of a train moving in the opposite direction on such block. By combining the two different types of mechanisms or systems just referred to in the manner specified each will serve at its end of the block as a detector for the other at such point, and neither will be in condition to indicate that it is safe for a vehicle or train to proceed if the other is in condition to indicate that it will be dangerous for such vehicle or train to proceed.

The automatic train-controlling or train-stopping system will preferably embody a normally closed track circuit (by which I mean any circuit having a fixed position on the line of way) which may operate upon the power, brake or other movement-controlling medium on a vehicle in any of the ways set forth in my prior patents. Preferably this normally closed track circuit will operate upon such power, brake, or other medium substantially in the manner disclosed in my prior patent No. 735,527, granted August 4, 1903, that is to say, by varying the electrical characteristics of the normally closed circuit in such a manner that the train-stopping means will be operated upon, for example, when a portion of the battery is out of such normally closed circuit, but will not be operated upon when such portion is not short-circuited. On a single-track road divided into blocks such a normally closed circuit will usually be placed at each end of each block, one of these circuits controlling the train-stopping function when the train is moving in one direction, and the other controlling it when the train moves in the opposite direction.

The signaling means which coöperates with the means for automatically controlling the movement of a vehicle will be a single-track block-signal system, preferably a normal danger system of block signals, that is, a system of block signals in which danger is always indicated unless a vehicle or train on arriving at a predetermined point closes a circuit which shows that there is no danger condition present in the block ahead. This block system may be of any well-known type, substantially such, for example, as that disclosed in my prior application, Serial No. 256,289, filed April 18, 1905, the principal difference between the system shown in this case and that shown in said prior application being that one is a double-track system and the other a single-track system. My present invention, as in the invention disclosed in said prior application, may embody any normal danger system of block signals coöperative with automatic means for controlling the movement of a vehicle or train protected by such normal danger system of signals in which one of said main elements is controlled by the other; provided that said elements are so combined as to control the movement of a vehicle from one or the other end of a block in accordance with the direction of running. Preferably each of these main elements governs the other, that is to say, if there is a danger condition present in the automatic train-controlling means it will put the normal danger system of block signals in condition for indicating danger, and if there is a danger condition present in the normal danger system of block signals the automatic means for controlling the movements of the vehicle or train will, at the proper point, be put in condition for indicating danger. In each case, also, the signal or the automatic train-controlling means thus brought to a danger condition by the other will be so operated upon as to correspond to the direction of movement of a vehicle, the two complementary apparatuses or systems, to wit, the automatic controlling or train-stopping means and the block signal system, being each preferably divided into two parts, one of which is acted upon when the vehicle is moving in one direction, that is, enters a block from one end thereof, and the other of which is acted upon when the vehicle is moving in the opposite direction, that is, enters such block from the opposite end thereof.

In accordance with my present invention an automatic means or system for controlling the movement of a vehicle or train traveling on a single-track road may be combined with a single-track normal danger system of block signals to protect a vehicle of any type operated by power in any form.

No matter what the particular type of signaling means may be, whether it be a single-track normal danger system of block-signals or some other single-track signaling means, and no matter what may be the particular construction of the means for controlling the movement of the vehicle or train, at least one and preferably both of these main elements will embody a detector device responsive to a danger condition of the other and corresponding to the direction of running, so that if there is anything wrong with one system, no matter which it may be, the other will not only be put in a condition representing danger, but will also control the operation of means for indicating that such a danger condition is present, and the danger condition itself will correspond to the direction of travel of the vehicle or train. In the construction shown the detector which governs the block-signal system will usually merely set a semaphore or other signal to danger. The detecting means which governs the automatic train-controlling or stopping means will preferably be so constituted as to be capable of responding selectively to different conditions of those parts thereof located on a roadway, and particularly of responding selectively to different electrical conditions or characteristics of fixed controlling circuits, preferably connected to opposite ends of the rails of a block and governing respectively opposite directions of running of a vehicle or train on such track.

One of the principal features of this invention relates to a system for automatically controlling the movements of vehicles on a single-track road, in which system differentiated characteristics of a track-circuit, which is preferably normally closed, are made use of to indicate whether a danger or a safety condition is present at the entrance of a block which a vehicle or train is about to enter, and to make a record of such condition which will represent exactly the electrical condition of the system at that point at such time for either direction of running, and will thus constitute an effective means for determining whether engineers or motormen have proceeded with due regard to signals on such single-track road or whether their vehicles have been checked or stopped as a result of disregarding such signals. One of the principal elements of this portion of my present invention is indicating or recording means for indicating or recording from either end of a block on a single-track road danger and safety conditions of the automatic means for controlling the movement of the vehicle, as well as for indicating or recording the non-working condition of such automatic controlling means when the vehicle is not adjacent to the point of control.

Other features of my invention not hereinbefore referred to will be hereinafter described and claimed and are illustrated in the accompanying drawings, in which Figure 1 is a diagrammatic view of a single-track road protected by automatic controlling means and a single-track normal danger system of block-signals in accordance with this invention, the parts being shown in their normal positions, both at the track and on the vehicle indicated diagrammatically as traveling thereon: Fig. 2 is a transverse sectional elevation of the track-rails, a contact-rail, and a pair of wheels and an axle of a vehicle traveling on the track-rails, and illustrates contact devices for engaging the contact-rails; Fig. 3 is an enlarged detail showing in side elevation, with parts broken away, the main elements of the recording means employed by me for indicating and recording the condition of an automatic controlling circuit for governing the movement of the vehicle; Figs. 4 and 5 are details illustrating in plan a portion of said recording means and showing the different records representing danger and safety conditions, and also showing the normal record representing the non-working condition of the recording means when the vehicle is not adjacent to the point at which it can be controlled by the track-circuit of the automatic stopping means. Fig. 6 is a diagram of a complete single-track normal danger block system combined with an automatic train-stopping system and embodying my invention.

Similar characters designate like parts in all the figures of the drawings.

The automatic controlling devices on a vehicle or train for shutting off the power and applying the brakes or other movement controlling medium may be of any suitable type, preferably substantially similar to those disclosed in my prior application No. 256,289 hereinbefore specified, and in my prior patent No. 735,527 also hereinbefore mentioned. These or any other suitable automatic controlling devices may be governed by any proper means controlled by a danger condition on the line of way, such, for example, as the presence of another vehicle or train ahead. In the diagram illustrated in Fig. 1, I have shown a portion of a single-track railway both of the rails of which constitute sectional conductors forming parts of corresponding block circuits. The rails of each block are designated by 30 and 31 respectively.

While any suitable means or block-signal system may, as before stated, be used in connection with the other devices of my present invention for controlling traffic in both directions on a single-track road, I prefer to employ in connection with the automatic means for controlling the power, brake, etc., coacting or complementary controlling means, such as a single-track normal danger system of block signals, which will be similar to that illustrated in my prior application just mentioned. The normal danger system shown in Fig. 1 embodies two series of semaphores or equivalent signals, such as s and s', one series corresponding to one direction of movement of trains and the other series to the opposite direction of movement. Each block of a single-track road is preferably protected by two semaphores placed at opposite sides of the track, one of which semaphores constitutes an element of one series and is placed near one end of the block, and the other of which constitutes an element of the other series and is placed near the opposite end of said block. Each semaphore of a block may be controlled by a block-circuit similar to that illustrated in my prior application No. 256,289, the circuit of the semaphore s including a conductor 40 which extends to an electrical controlling device or magnet 41 governing the automatic means for controlling the movement of a vehicle and serving to assure the presence of a danger condition in the automatic means or circuit for controlling the movement of the vehicle whenever such danger condition is present in the corresponding portion of the block-signal system. From the electrical controlling device or magnet 41 a conductor 42 extends in this construction to a switch 43 of a relay or other electrical controlling device, the coils of the relay being designated by 44 and forming part of the means for automatically controlling the movements of the vehicle. The switch 43 is normally in engagement with a contact 44ª, from which a conductor 45 extends, the other elements of this circuit being those of any approved normal danger block circuit. Each of the semaphores or signals s will be controlled by a circuit containing not less than two breaks one of which breaks in the signal circuit will be controlled from one block and another from the next adjoining block, and one of which breaks is normally open and another normally closed, in the usual manner. Each semaphore s will normally stand at danger because the break controlled by the block adjacent to such semaphore is normally open. Under such conditions the controlling device or magnet 41 is normally deënergized and its armature retracted against the back contact of the relay. If a vehicle enters a block and there is no train on the block ahead, the normally open break of the block entered by the vehicle will be closed and the corresponding semaphore will be moved to the clear position. If, however, there is a vehicle or train on the block ahead, the normally closed break controlled by such vehicle on the block ahead will be opened and the semaphore will remain at danger.

The means on the traveling vehicle for automatically stopping the same will preferably be governed by a main controlling magnet, such as 23. For the purpose of governing this magnet I prefer to make use of controlling means at the track, such as an electric circuit, adapted to be brought intermittently into coöperative relation with those parts of the automatic controlling or train-stopping means which are located on the vehicle. Such a track circuit is preferably located at each end of a block to correspond to the different directions of running, and is preferably normally closed and adapted to exhibit different characteristics according as it is safe or dangerous to proceed beyond the point at which the controlling means is located. Usually different electrical conditions or characteristics of such controlling circuit for governing the movement of the vehicle will result from increasing or decreasing the strength of the current flowing in a given portion of the circuit by cutting out or interpolating cells of a battery in such circuit or portion thereof. This battery, in the present system, is governed automatically by the electrical controlling device or magnet 41 governed by the other main controlling means just described, to wit, the circuit of the block-signal system, this block-signal circuit being properly combined with the normally closed controlling track circuit to protect the block for one direction of running. When the electrical controlling device 41 is deënergized, which is normally the case, because the block circuit of the normal danger system is normally open and the semaphore or other signal s in a danger position, a circuit-controller or switch, such as 48, carried by the armature thereof, may operate to cut into the track circuit of the means for automatically stopping the vehicle, a portion of the source of energy or battery, such as the portion indicated by 49.

The circuit in which the cells 49 are connected is a simple one, as shown herein. It includes in this case a track contact, such as a single short contact-rail 50 located at one side of the center of the track in the path of one of a pair of traveling contact-makers, such as 52 and 53, on the vehicle, said contact-rail being preferably located between the track-rails 30 and 31. At one end thereof this contact-rail 50 is connected by means of a conductor 55 with one terminal of the electrical controlling device or relay coils 44, the other terminal of which is connected by a conductor 54 with the track-rail 30 at a point adjacent to the contact-rail 50. At its other end said contact-rail is connected by a conductor 57 with a single cell 58 of the battery, which as a whole is designated generally by b. The circuit in which the contact-rail 50 is connected is normally completed by a conductor 56 which connects the track-rail 30 and one end of the switch 48, and by a conductor which connects one side of the group of cells 49 with the terminal 61, which constitutes the back contact of the armature and switch 48. The front contact is indicated at 60 and is connected by a conductor 59 with the cells 49 and 58 of the battery b in parallel. Because of these connections current from the whole of the battery b or from the cell 58 only may flow through either of two parallel branches according as the controlling device 41 is or is not energized. Whether said controlling device 41 is energized, as is the case when the block circuit of the normal danger system is closed, or whether said controlling device is deënergized, as is the case when the block circuit of the normal danger system is open, the circuit through the battery b will always normally be closed. When the cells 49 of the battery are in circuit, as is normally the case, the track-circuit of the means for controlling the movement of the vehicle will be traversed by the current of all the cells 49 and 58 in series, this current from the whole battery being utilized to actuate the automatic stopping means on a vehicle when a danger condition is present. When the controlling device 41 is energized and the cells 49 are cut out, the current traversing such track circuit of the automatic train-controlling or train-stopping means will be only the current of the cell 58, which will act only as a controlling or detecting current to determine whether the circuits are in proper condition and to operate a proper indicating or recording device for showing that fact. The current from the single cell 58 will not be sufficient to energize the main controlling magnet 23 on the vehicle sufficiently to attract the armature of such magnet, but the current of the whole battery b will be sufficient to cause the attraction of such armature.

From the foregoing description it will be seen that the system disclosed herein for automatically controlling the movement of a vehicle is a normal danger system of controlling such movement, just as the block-signal system is a normal danger system of block-signals, and the conditions are such that a vehicle or train moving in the direction of the arrow in Fig. 1, on reaching the contact-rail 50 will always be automatically stopped unless the track is clear ahead. This is due to the fact that the cells 49 of the battery b are cut in or out in harmony with the breaking or the making of the block circuit of the normal danger system of block signals, said cells 49 being normally inserted, as shown in Fig. 1, to represent a danger condition, but being cut out by the energization of the magnet 41 whenever both the forward and the rear breaks in the adjacent block circuit in the normal danger system of block signals are closed. The strength of the current supplied by the whole battery b and that supplied by the single cell 58 of said battery are so proportioned, as before stated, that the main controlling magnet 23 will not be energized sufficiently to attract its armature when the cell 58 is in circuit, but will attract its armature when such cell is in series with the cells 40. The coils of the relay magnet 41 and the armature 48 thereof therefore govern the controlling or detecting function and also the differentiated working or emergency function of the normally closed track-circuit for governing the movement of the vehicle on a line of way protected by such circuit, it being evident that when the closed circuit is through the branch which includes the cells 49 a current of maximum efficiency or strength will influence the main controlling magnet 23 on the vehicle when said magnet comes within the field of action of such track circuit.

When the circuits of both of the controlling means hereinbefore described, to wit, a system of block signals and the automatic train-stopping means, are in proper working condition, the train-stopping track circuit will only be effective for stopping a train when the block circuit of the block signal system is interrupted and the magnet 41 deenergized. At such time the engineer or motorman of an approaching train or car is warned by the signal s that there is a danger condition ahead, and unless he stops his train before reaching the track contact 50 the working current in the train-stopping track circuit will pass through a short-circuit on the train on the engagement of the traveling contact-maker 52 with said track-contact, and the controlling magnet 23 will be energized and the train automatically stopped by devices such as those shown in my prior patent No. 735,527, and in my prior application No. 256,289, practically all of the current of the battery b being effective at this time and being in circulation in the traveling branch of the automatic train-controlling or train-stopping circuit, owing to the fact that the track branch, which includes the coils 44, is of high resistance and requires but little current to keep the armature 43 attracted.

A simple type of electric circuit, with its included traveling contact-makers, may be employed on the vehicle or train for coöperation with the train-stopping track-circuit just described and with the track contact 50, and also for coöperation with a similar train-stopping track circuit and a similar track contact 51 corresponding to the opposite direction of running from that represented by the contact 50 and its track circuit. As in my prior application No. 256,289, the short-circuit for operating the automatic controlling means on the vehicle includes the contact-making or current-collecting devices 52 and 53 and a pair of conductors 62 and 63 leading from said current-collecting devices toward one side of the main controlling electromagnet 23. Any suitable type of current-collecting devices may be employed. This short circuit also includes a conductor 90 which leads from an axle 91 on a car or other vehicle to the other side of said magnet 23, this conductor serving to make connection through said axle and the wheels 92 with the track-rails 30 and 31. This short-circuit on the vehicle differs from that described in said prior application No. 256,289 in that means is provided for connecting the conductors 62 and 63 alternately in circuit with the main controlling magnet 23 in accordance with the direction in which the vehicle is traveling, so that there will be no interference between the controlling devices which govern the movement of the vehicle or train when traveling in one direction and those devices which govern it when traveling in the opposite direction. The means shown herein is a simple electric switch 93 controlling a pair of contacts 94 and 95 and connected by a conductor 96 directly to one terminal of the magnet 23. The major portion of this switch will preferably be mounted in a locked casing such as 97, containing the contacts 94 and 95, and only the handle of the switch need project through the box. Said switch may be set and locked for one direction of travel when a train starts out in one direction and need not be changed until a run is finished and the train starts back in the opposite direction.

In order that the two coacting or complementary controlling means, one of which governs a semaphore or similar signal and the other of which governs the movements of the vehicle, may operate properly under all conditions, it is important that provision be made which will render it impossible for either the block-signal circuit or the train-stopping circuit to be in the condition representing safety if the other is not in working condition or for any other reason is in a condition corresponding to or representing danger. Because of this I prefer to supply each of such circuits with a detector device the function of which is to respond to a danger condition of one circuit and establish immediately a danger condition in the other circuit. Thus, if the block circuit of the semaphore or signal s is broken, the coils of the relay 41 are deënergized and the armature 48 of this relay is retracted, cutting in the cells 49 of the battery b of the train-stopping track circuit and thereby establishing a danger condition in such track circuit and providing means for bringing about an emergency operation for controlling the movement of the vehicle. This relay constitutes a detector device which is governed by the block-signal circuit and governs said train-stopping track circuit. The coils of the relay 44 when energized attract the armature 43 and normally keep one break in the block-signal circuit closed, to wit, the break between said armature 43 and the contact 44ª. If for any reason the coils 44 of this relay are not sufficiently energized to attract said armature, this break in the block-signal circuit in the normal danger system of block signals will be opened, and even though both the forward and the rear breaks in the normal danger block-signal circuit be closed it will be impossible for such block-signal circuit to set the semaphore s to safety. Thus this relay constitutes a detector device which is governed by a danger condition in the train-stopping track circuit, and when such danger condition is present said relay immediately establishes a corresponding danger condition in the normal danger block-signal circuit and assures the holding of the semaphore s in the danger position. This detector device will hold this third break in the block-signal circuit closed at all times if the train-stopping track circuit is in working condition, that is to say, if it is not actually interrupted at some point, or if the battery is not exhausted or too weak to control the circuit properly, or some other extraordinary condition renders such circuit ineffective.

In my prior patents and applications I have in several instances shown means for indicating and recording the condition of the automatic means for controlling the movement of a vehicle each time that a vehicle passes a point at which such a controlling action can take place, in order that such indication or record may be used as a check upon the engineer or motorman. Except in the construction shown in my prior application No. 256,289, the indicating or recording means illustrated in such prior systems was responsive only to two conditions, one of which represented danger and the other safety, and only one of which corresponded to an electrical characteristic of a circuit or controlling device. In the present case I prefer to employ indicating or recording means of the type illustrated in said application No. 256,289, capable of indicating or recording not only whether an emergency operation does or does not take place, but also of indicating and recording all conditions or positions which it is possible for the controlling means to assume at any point on a line of way for either direction of travel, and whether at a controlling point or between two widely separated controlling points.

The main conditions of the automatic means for controlling the movements of a vehicle are the non-working condition, in which the apparatus on the vehicle is out of the sphere of influence of the corresponding controlling means at the track; the safety condition, in which the controlling means on the vehicle is not operated to check or stop the movement of the vehicle when such controlling means comes within the sphere of influence of the controlling means at the track; and the danger condition, which results in the operation of the automatic controlling means on the vehicle when within the sphere of influence of the controlling means at the track while a danger condition is present at such point on the track. In order to indicate and record all three of these conditions I prefer to make use of indicating or recording means governed by differential electrical record-controlling devices which control the making of two different indications or records, while the absence of current, or any other condition, may control the making of the third indication or record. I have shown herein indicating or recording means capable of assuming three different positions, one of which represents danger, another safety, and the third the non-working condition of the indicating or recording means, that is, its condition when it is without the sphere of action of the train-stopping track-circuit and track-contacts, the danger and safety conditions being governed in such indicating or recording means by two differential electrical controlling devices one of which is responsive to that electrical condition of the normally closed train-stopping track-circuit hereinbefore described which represents safety, and the other of which is responsive to that electrical condition of said normally closed circuit which represents danger. Thus one of such differential electrical record-controlling devices is governed by a train-controlling track-circuit when the cells 49 of the battery b are in said track-circuit, and the other is controlled by said track-circuit when said cells are cut out of the track-circuit. Any suitable means may be employed for indicating or recording these two different electrical conditions and the non-working condition of the automatic train-stopping means when the same is distant from the track-contact 50 or 51 with which it is adapted to coöperate, according as the vehicle is moving in one direction or the other. As here shown, the recording means is preferably included in parallel with the same electric circuit or short-circuit that includes the controlling magnet 23. In order to operate two differential electrical record-controlling devices selectively the armature 22 of the controlling electromagnet 23 constitutes with its magnet a main selector and governs such record-controlling devices selectively according as the main selector 23 is or is not energized. From the terminal 71 a conductor 73 leads to one terminal of an electrical controlling device, here shown as an electromagnet 74, the other terminal of this magnet being connected by a conductor 75 to the switch 93. The other terminal or front contact 72 is connected in a similar manner by a conductor 76 to one terminal of a differential electrical controlling device or magnet 77 the other side of which is also connected to the conductor 75. It will be evident from this that these two electrical controlling devices 74 and 77 are connected in parallel branches of the short-circuit on the vehicle, but that both of their circuits can not be simultaneously closed. The circuit of the controlling device 74 is closed when the cells 49 are cut out of the track-circuit, at which time the main controlling magnet 23 is not sufficiently energized to attract its armature 22. The other controlling device 77 is energized only when the cells 49 are in circuit, at which time the electromagnet 23 is energized and attracts its armature and closes the break at 72.

It is important that all of the controlling or detecting devices or resistances in the track-circuit of the automatic means for controlling the movements of a vehicle and in the short-circuit on the vehicle, as well as the controlling device or resistance in the block-circuit of the block-signal system, shall be so related to one another as to assure the proper carrying out of all the different controlling and detecting functions that have been hereinbefore described. While these resistances may of course be varied considerably, the following distribution has been found to work well in practice. The magnet or coils 44 may have a resistance of one thousand ohms, because it is desirable that only a very small amount of current shall flow through this controlling device, which amount will be sufficient to cause the armature 43 to be attracted even when only the single cell 58 is in the train-stopping track-circuit. The controlling device 41 may have a resistance of twenty ohms, the main controlling magnet 23 on the vehicle a resistance of twenty-two ohms, and the two differential controlling devices 74 and 77 may have resistances of five and fifty ohms respectively. With the resistances thus adjusted not only will all of the devices at the track coöperate properly but the devices on the vehicle will also be energized or left unenergized according as the electrical characteristic of the train-stopping track-circuit varies. Thus current in said train-stopping track-circuit will not be sufficient to energize the main controlling magnet or selector 23 when the traveling contact-maker 52 or 53 is in engagement with a contact-rail 50 or 51 if at such time the cells 49 are cut out of the train-stopping track-circuit. At such time, however, the current supplied by the single cell 58 will be sufficient to energize the secondary controlling device or magnet 74. With the cells 49 in circuit the current will be sufficient in strength to energize the main magnet 23, attract the armature 22, close the parallel branch through the electromagnet 77 and keep the relatively high resistance magnet 77 energized.

It will be seen from the foregoing that not only do the controlling devices 44 and 41 constitute detector devices for the block-signal circuit and the train-stopping track-circuit respectively, but that the main controlling magnet 23 and the secondary controlling magnets 74 and 77 on the train also constitute main and secondary detector devices, which last two are responsive respectively according as the first or main magnet 23 on the vehicle is or is not energized, this magnet 23 being in turn responsive according as the train-stopping track-circuit exhibits one or another electrical characteristic.

All of the elements of the indicating or recording means may be enclosed in a locked casing, such as 78, the lock 79 which gives access to the contents of this casing not being under the control of the engineer or motorman, when such casing is placed on the train, but being capable of being unlocked only by a key or combination in the possession of a superior officer of the road. The recording means will preferably include a time-train which in this case is secured to the back of a substantially central partition 80, said clockwork being indicated in dotted lines at 81. This clockwork serves to impart movement to a feed-roll or equivalent device for feeding a record medium, such as a web of paper 82, from one point to another. This web of paper may be in the form of a roll and may be fed from a suitable supply point to and wound upon a receiving spindle or roll, such as 84, this latter being the feed-roll and being positively actuated by the clockwork. In its passage from the supply point to the receiving point the web passes over an intermediate guide-roll or supporting-roll, such as 83, at which point the record may be made. This record may be made in any suitable way, as for example, by a recording device 85 in the form of a stylus secured to one end of an armature 86. The armature 86 is common to the two record-controlling devices or magnets 74 and 77 and is normally held in a central position away from the poles of both of these magnets. This central position of said armature may be controlled by a pair of springs 87 connected to fixed points at opposite sides of the armature, and when the armature is in this position it will locate the stylus 85 in a position for making a record corresponding to the non-working condition of the system. When, however, the apparatus on the vehicle is in coöperative relation with that at the track the magnet 74 will be energized if a safety condition is present in the train-stopping track-circuit. At such time, instead of making the record r, which represents the normal or non-working condition, the armature will be attracted to the left, as shown in Fig. 4, and will cause the stylus 85 to make the record r'. If, when the traveling and fixed elements of the controlling system are in coöperative relation a danger condition is present in the train-stopping track-circuit, the magnet 77 will be energized and a record, such as r'', will be made by the stylus. The two records r' and r'' being at opposite sides of the normal or non-working record r, indicate clearly the difference between safety and danger, and by marking on the tape 82 a permanent record is made of the exact condition of affairs at all points on the line of way. This record will be the same for either direction of running, but the making of the record will be controlled by one or the other of two sets of train-controlling or train-stopping devices, according as the vehicle is running in one direction or the other. Which set of such devices is to control the making of records will depend upon the position of the switch 93, which will be in the position shown when the vehicle or train is moving in the direction of the arrow in Fig. 1, and will be in the opposite position in engagement with the contact 95 when the train is running in the other direction. By the use of this switch the same apparatus on a car or other vehicle is adapted to coöperate with automatic train-controlling means and with the signal system at either end of a block, only one set of train-controlling or train-stopping devices being capable of coöperation with the devices on a vehicle at one time, owing to the fact that the two contact-rails 50 and 51 are out of alinement, and owing to the further fact that a circuit from both of these contact-rails through the devices on a vehicle or train can not be closed during the passage of such vehicle along a block in either direction.

The elements of the train-controlling system which correspond to one direction of running are shown at the right hand in Fig. 1 and have been described in detail. Those elements of the automatic train-controlling means which correspond to the other direction of running are shown at the left in said figure, as are also the elements of the complementary controlling means or block-signal system. The devices shown at the left in said figure are substantially identical with those shown at the right except that the contact-rail 51 is at the opposite side of the center of the track, and all of the other parts occupy similar positions to those shown at the right in said figure, except that they are placed at the opposite side of the track. The parts at the left in Fig. 1 which correspond to those at the right in said figure are represented by the same reference characters with prime marks, except that the terminal which corresponds to the terminal 44$^a$ is designated 44$^b$. From this description it will be seen that a vehicle coming onto a block from the left in Fig. 1 will not be influenced by the controlling devices at the left in said figure, although the contact-arm 53 will engage the contact-rail 51. No action of the devices on the vehicle will result from this contact, however, because the controlling circuit on the vehicle is open at 95. When the contact-arm 52 engages contact 50, however, a circuit will be closed through conductors 62, 90 to the controlling devices on the train, and a safety or danger record will be made and the magnet 23 only partly energized or fully energized according as there is or is not a danger condition present and indicated by the condition of the parts at the right in Fig. 1. If the vehicle is running in the opposite direction from that indicated by the arrow, the circuit on the vehicle will be broken at 94 and closed at 95, in which case the contact 52, though it engages the contact 50 on entering the block, will cause no action of any of the devices on the vehicle, which will proceed until the contact-arm 53 engages the contact-rail 51, when the controlling devices on the vehicle will be actuated in accordance with the condition of the track-circuit of the automatic controlling means for stopping the train substantially as before described. Thus when a train is running in one direction on such single-track railway only the signals corresponding to that direction of running should be regarded, and only the automatic train-stopping devices corresponding to that direction of running will be capable of acting upon the train-stopping and recording devices, and the semaphores and train-stopping track-circuits corresponding to the other direction of running will be out of action and will have no influence upon the train when running in such direction.

In connection with the devices hereinbefore described I may make use of any suitable means, such for example as shown in my aforesaid patent No. 735,527, for resetting the controlling mechanism on a vehicle and permitting the engineer or motorman to proceed without loss of time after an automatic or emergency action for shutting off the power or applying the brakes, or both, has taken place.

In order to prevent tampering with the conductors of the controlling means on the vehicle, all of the conductors before described may also be run through conduits of metal or other material, if desired.

In Fig. 6 I have illustrated a complete single-track normal-danger block system combined with the automatic train-stopping apparatus hereinbefore described. In this diagram two complete sets of train-stopping apparatus are shown for two blocks of a single-track normal-danger block signal system, such train-stopping apparatus being substantially a duplicate of that shown in Fig. 1, and all of the parts which correspond being designated by the same reference characters. As in the regular practice in normal-danger block signal systems, each block is divided into two sections, and in this way the action of the train-stopping apparatus at one end of the block is readily differentiated from that of the train-stopping apparatus at the other end of the same block. In this way 99 designates a series of track batteries, one for each section of each block, which track batteries control in the usual way the track relay connected in the track circuit at the opposite end of the same section. These track relays are differentiated from one another, as they have different functions, these functions being dependent upon whether the relays are intended to control signals placed at one side of the road of a single track road, or at the other side of such road, or are intended to control the relation between different adjoining sections of the track. As shown, they are divided into three groups, two relays being designated by 100 and corresponding to one direction of running, and two others being designated by 101 and corresponding to another direction of running, the two others being designated by 102 and serving to control the connections between adjoining sections for both directions of running. 103 designates sources of energy, such as batteries, for supplying current to the block-signal circuits of the normal-danger block signal system. 104 is a common wire or conductor controlling all of the circuits of a single-track normal-danger system. 105 indicates insulation dividing the different blocks from one another and also dividing the two sections of each block from each other. 106 and 107 designate two switches controlled by each relay magnet 100. 108, 109 and 110 indicate similar switches controlled by each relay magnet 101. 111, 112, 113 and 114 indicate switches controlled by each relay magnet 102. All of the parts of this single-track normal-danger block signal system are or may be of well-known construction in most respects, and the construction, organization and mode of operation of the parts just described are well understood. All the parts of the system as illustrated in Fig. 6 are normally at danger, as shown, there being no vehicle on any section of any block. In this condition of affairs the switches 106 are always energized and close the break which they control, while the switches 107 keep open the break which they control. In a similar manner each switch 108, which is normally energized, keeps open the break which it controls, while the normally-energized switches 109 and 110 controlled by the same relay magnet 101, normally close the breaks which they control. Normally the switches 111, 112, 113 and 114 are all energized and keep closed the breaks which they control. Thus each block circuit of the normal-danger block system for each direction of running has therein one break, so that every signal remains at danger. In one direction of running the signal-controlling magnet 41 of a signal S is in a circuit having one break therein, which is at the contact controlled by the switch 107; while for the other direction of running the signal magnet 41′ of a signal S′ has in its circuit one break, which is at the contact controlled by the switch 108. All of the other switches for each of the circuits are normally closed, so that on the short-circuiting of a relay 100 or a relay 101 the switch 107 or the switch 108, as the case may be, will close the break controlled thereby and complete the circuit of the signal magnet 41 or 41′, as the case may be, and thus clear the corresponding signal S or S′. The operation of the relays 102 is similar to that of corresponding relays used in the ordinary types of single-track normal-danger block signal systems. The manner in which a single-track normal-danger block signal system controls and is controlled by the automatic train-stopping devices on the track, has been fully described.

What I claim is:

1. The combination with a pair of traffic rails, of automatic means for governing the power, brake or other movement-controlling medium on a vehicle movable in either direction on said traffic rails, said means including separate devices one associated with one traffic rail for governing said vehicle when moving in one direction and the other associated with the other traffic rail for governing said vehicle when moving in the other direction.

2. The combination with a pair of traffic rails, of automatic means for governing the power, brake or other movement-controlling medium on a vehicle movable in either direction on said traffic rails, said means including a pair of electric circuits one connected with one traffic rail only for governing said vehicle when moving in one direction and the other connected with the other traffic rail only for governing said vehicle when moving in the other direction.

3. The combination with a pair of traffic rails divided into blocks, of automatic means for governing the power, brake or other movement-controlling medium on a vehicle movable in either direction on said traffic rails, said means including a pair of controlling devices located respectively at opposite ends of said block.

4. The combination with a pair of traffic rails divided into blocks, of automatic means for governing the power, brake or other movement-controlling medium on a vehicle movable in either direction on said traffic rails, said means including a pair of electric circuits connected respectively with opposite ends of said block and localized means for supplying current to said circuits.

5. The combination with a pair of traffic rails divided into blocks, of automatic means for governing the power, brake for other movement-controlling medium on a vehicle movable in either direction on said traffic rails, said means including a pair of electric circuits connected respectively with opposite traffic rails at opposite ends of said block.

6. The combination with a pair of traffic rails divided into blocks, of automatic means for governing the power, brake or other movement-controlling medium on a vehicle movable in either direction on said traffic rails, said means including a pair of normally closed electric circuits connected respectively with opposite ends of said block and means for normally supplying current to said circuits.

7. The combination with a pair of traffic rails divided into blocks, of automatic means for governing the power, brake or other movement-controlling medium on a vehicle movable in either direction on said traffic rails, said means including a pair of normally closed electric circuits governing the movements of said vehicle and connected respectively with opposite traffic rails at opposite ends of said block.

8. The combination with a pair of traffic rails divided into blocks, of automatic means for governing the power, brake or other movement-controlling medium on a vehicle movable in either direction on said traffic rails, said means including a pair of circuits connected respectively with opposite ends of said block and each containing a track contact and also including localized means for supplying current to said circuits.

9. The combination with a pair of traffic rails divided into blocks, of automatic means for governing the power, brake or other movement-controlling medium on a vehicle movable in either direction on said traffic rails, said means including a pair of electric circuits connected respectively with opposite ends of said block and each containing a track contact, said track contacts being located in different positions transversely of the traffic rails and also including localized means for supplying current to said circuits.

10. The combination with a pair of traffic rails divided into blocks, of automatic means for governing the power, brake or other movement-controlling medium on a vehicle movable in either direction on said traffic rails, said means including a pair of electric circuits connected respectively with opposite traffic rails at opposite ends of said block and each containing a track contact, said track contacts being located in different positions transversely of the traffic rails.

11. The combination with a pair of traffic rails divided into blocks, of automatic means for governing the power, brake or other movement-controlling medium on a vehicle movable in either direction on said traffic rails, said means including a pair of normally closed electric circuits connected respectively with opposite traffic rails at opposite ends of said block and each containing a track contact, said track contacts being located in different positions transversely of the traffic rails.

12. The combination with a pair of traffic rails divided into blocks and with a vehicle movable thereon, of automatic means for governing the power, brake or other movement-controlling medium on said vehicle while the vehicle is moving in either direction on said traffic rails, said means including a pair of controlling devices located respectively at opposite ends of a block and also including a pair of controlling devices carried by said vehicle and coöperative respectively with such stationary controlling devices and also including localized power-supplying means coacting with said controlling devices at the ends of the block.

13. The combination with a pair of traffic rails divided into blocks and with a vehicle movable thereon, of automatic means for governing the power, brake or other movement-controlling medium on said vehicle while the vehicle is moving in either direction on said traffic rails, said means including a pair of controlling devices located respectively at opposite ends of a block and also including a pair of controlling devices carried by said vehicle and coöperative respectively with such stationary controlling devices and also including localized power-supplying means coacting with said controlling devices at the ends of the block, and means for rendering one of said traveling controlling devices effective for one direction of running and the other effective for the other direction of running.

14. The combination with a pair of traffic rails divided into blocks and with a vehicle movable thereon, of automatic means for governing the power, brake or other movement-controlling medium on said vehicle while the vehicle is moving in either direction on said traffic rails, said means including a pair of controlling devices located respectively at opposite ends of a block and also including a short circuit on the vehicle, a pair of traveling controlling devices carried by said vehicle, localized means for supplying current to said circuit, and means for connecting said traveling controlling devices in said short circuit selectively in accordance with the direction of running.

15. The combination with a pair of traffic rails divided into blocks, and with a vehicle movable thereon, of automatic means for governing the power, brake, or other movement-controlling medium on said vehicle while the vehicle is moving in either direction on said traffic rails, said means including a pair of controlling devices located respectively at opposite ends of a block and also including a short circuit on the vehicle, a pair of traveling controlling devices carried by said vehicle, and a hand-switch for connecting one or the other of said controlling devices in said short circuit in accordance with the direction of running.

16. The combination with a pair of traffic rails divided into blocks, of controlling means adjacent to the traffic rails for governing the power, brake, or other movement-controlling medium on a vehicle movable in either direction on said traffic rails, said means including a pair of controlling devices located at opposite ends of a block, and a block-signal system including semaphores or similar signals at opposite ends of the block and governed respectively by said respective controlling devices.

17. The combination with a pair of traffic rails divided into blocks, of controlling means adjacent to the traffic rails for governing the power, brake, or other movement-controlling medium on a vehicle movable in either direction on said traffic rails, said means including a pair of controlling devices located at opposite ends of a block, and a block-signal system including semaphores or similar signals at opposite ends of the block, the danger condition of each of which signals is co-existent with that of the corresponding controlling device.

18. The combination with a pair of traffic rails divided into blocks, of controlling means adjacent to the traffic rails for governing the power, brake or other movement-controlling medium on a vehicle movable in either direction on said traffic rails, said means including a pair of controlling devices located at opposite ends of a block, and an electrical block-signal system including semaphores or similar signals at opposite ends of the block, the circuit of said system having a pair of breaks normally closed respectively by said controlling devices.

19. The combination with a pair of traffic rails divided into blocks, of a pair of electric circuits connected respectively with opposite ends of a block and governing respectively the power, brake, or other movement-controlling medium on a vehicle movable in either direction on said traffic rails, and a block-signal system including semaphores or similar signals at opposite ends of the block which semaphores are governed respectively by said respective circuits.

20. The combination with a pair of traffic rails divided into blocks, of automatic electric means at each end of a block for governing the power, brake, or other movement-controlling medium on a vehicle movable in either direction on said block, and differentiated means controlled by danger conditions at either end of a block for intermittently increasing the strength of the current flowing through the automatic electric means at one or the other end of a block in accordance with the direction of running.

21. The combination with a pair of traffic rails divided into blocks, of automatic means including an electrical device at each end of a block for governing the power, brake, or other movement-controlling medium on a vehicle movable in either direction on said block, and differentiated means controlled by danger conditions at either end of a block for short-circuiting one or the other of said electrical devices in accordance with the direction of running.

22. The combination with a pair of traffic rails divided into blocks, of electrical devices at opposite ends of a block each of which is connected in a normally closed circuit and which respectively govern the power, brake, or other movement-controlling medium on a vehicle movable in opposite directions on said block, and differentiated means controlled by danger conditions at either end of a block for short-circuiting one or the other of said electrical devices in accordance with the direction of running.

23. The combination with a pair of traffic rails divided into blocks, of electrical means including an electrical device at each end of a block for governing the power, brake, or other movement-controlling medium on a vehicle movable in either direction on said block, and a block-signal system governing opposite directions of running for short-circuiting one or the other of said electrical devices in accordance with the direction of running.

24. The combination with a pair of traffic rails divided into blocks, of means at different points in a block for governing the power, brake, or other movement-controlling medium on a vehicle movable in opposite directions on said block, and means governed by a danger condition on said block and governed by and governing said first means in accordance with the direction of running.

25. The combination with a pair of traffic rails divided into blocks, of means at different points in a block for governing the power, brake, or other movement-controlling medium on a vehicle movable in opposite directions on said block, and a block-signal system including semaphores or similar signals at opposite ends of a block which signals are governed by and govern said means in accordance with the direction of running.

26. The combination with a pair of traffic rails divided into blocks, of electrical means at opposite ends of a block for governing the power, brake, or other movement-controlling medium on a vehicle movable in opposite directions on said block, and means governed by a danger condition on said block and governed by and governing said electrical means in accordance with the direction of running.

27. The combination with a pair of traffic rails divided into blocks, of means for governing the power, brake, or other movement-controlling medium on a vehicle from different points in a block in accordance with the direction of travel of the vehicle, and means for governing a semaphore or similar signal at opposite ends of a block in accordance with the direction of running. each of said means governing a danger condition of the other.

28. The combination with a pair of traffic rails divided into blocks, of a pair of controlling means, one of which is a single-track normal danger system of block-signals, and the other of which is means for automatically governing the power, brake, or other movement-controlling medium on a vehicle from either end of a block in accordance with the direction of running.

29. The combination with a pair of traffic rails divided into blocks, of a pair of controlling means one of which governs the other, and one of which is a single-track normal danger system of block-signals, and the other of which is means for automatically governing the power, brake, or other movement-controlling medium on a vehicle from either end of a block in accordance with the direction of running.

30. The combination with a pair of traffic rails divided into blocks, of a pair of controlling means each of which governs the other, and one of which is a single-track normal danger system of block signals and the other of which is means for automatically governing the power, brake, or other movement-controlling medium on a vehicle from either end of a block in accordance with the direction of running.

31. The combination with a pair of traffic rails divided into blocks, of a pair of controlling means, one of which is a single-track normal danger system of block-signals, and the other of which is a pair of electric circuits at its ends of a block for automatically governing the power, brake, or other movement-controlling medium on a vehicle from either end of the block in accordance with the direction of running.

32. The combination with a pair of traffic rails divided into blocks, of a pair of controlling means, one of which is a single-track normal danger system of block-signals, and the other of which is a pair of normally-closed electric circuits at opposite ends of a block for automatically governing the power, brake, or other movement-controlling medium on a vehicle from either end of the block in accordance with the direction of running.

33. The combination with a pair of traffic rails divided into blocks, of a pair of controlling means, one of which is a pair of electric circuits at opposite ends of a block for automatically governing the power, brake, or other movement-controlling medium on a vehicle from either end of a block in accordance with the direction of running, and the other of which is a single-track normal danger-system of block-signals governing said circuits in accordance with the direction of running.

34. The combination with a pair of traffic rails divided into blocks, of a pair of controlling means one of which is a pair of electric circuits, each including an electrical device, at opposite ends of a block for automatically governing the power, brake, or other movement-controlling medium on a vehicle from either end of the block in accordance with the direction of running, and the other of which is a single-track normal danger system of block-signals governing the short-circuiting of said electrical device in accordance with the direction of running.

35. The combination with a pair of traffic rails divided into blocks, of a pair of controlling means one of which is a pair of normally-closed electric circuits, each including an electrical device, at opposite ends of a block for automatically governing the power, brake, or other movement-controlling medium on a vehicle from either end of the block in accordance with the direction of running, and the other of which is a single-track normal danger system of block-signals governing the short-circuiting of said resistance in accordance with the direction of running.

36. The combination with a pair of track rails divided into blocks, of a pair of controlling means one of which is a pair of electric circuits at different points in a block for automatically governing the power, brake, or other movement-controlling medium on a vehicle from either end of a block in accordance with the direction of running, and the other of which is a single-track electrical block-signal system governing and governed by said circuits in accordance with the direction of running.

37. The combination with a pair of track rails divided into blocks, of a pair of controlling means one of which is a pair of electric circuits at different points in a block for automatically governing the power, brake, or other movement-controlling medium on a vehicle from either end of a block in accordance with the direction of running, and the other of which is a single-track normal danger system of electrical block signals governing and governed by said circuits in accordance with the direction of running.

38. The combination with a pair of track rails divided into blocks, of a pair of controlling means one of which is a pair of electric circuits at different points in a block for automatically governing the power, brake, or other movement-controlling medium on a vehicle from either end of a block in accordance with the direction of running, and the other of which is a single-track electrical block signal system having detecting devices governed respectively by said circuits in accordance with the direction of running.

39. The combination with a pair of track-rails divided into blocks, of a pair of controlling means each of which embodies detecting devices responsive selectively to danger conditions of the other controlling means in accordance with the direction of running, and one of which is a pair of electric circuits at different points in a block for automatically governing the power, brake, or other movement-controlling medium on a vehicle from either end of the block in accordance with the direction of running, and the other of which is a single-track electrical block signal system.

40. The combination with a pair of track rails divided into blocks, of a pair of controlling means each of which embodies detecting devices responsive selectively to danger conditions of the other controlling means in accordance with the direction of running, and one of which is a pair of normally closed electric circuits at different points in a block for automatically governing the power, brake, or other movement-controlling medium on a vehicle from either end of the block in accordance with the direction of running, and the other of which is a single-track electrical block-signal system.

41. The combination with a pair of traffic rails divided into blocks, of a pair of controlling means, one of which is a single-track normal danger system of block signals, and the other of which is means governed by such block signal system for automatically acting upon the power, brake, or other movement-controlling medium of a vehicle from either end of a block in accordance with the direction of running.

42. The combination with a pair of traffic rails divided into blocks, of means for automatically controlling the power, brake, or other movement-controlling medium of a vehicle traveling thereon from either end of a block in accordance with the direction of running, and means for indicating danger and safety conditions of such controlling means.

43. The combination with a pair of traffic rails divided into blocks, of means for automatically controlling the power, brake, or other movement-controlling medium of a vehicle traveling thereon from either end of a block in accordance with the direction of running, and means for recording danger and safety conditions of such controlling means.

44. The combination with a pair of traffic rails divided into blocks, of means for automatically controlling the power, brake, or other movement-controlling medium of a vehicle traveling thereon from either end of a block in accordance with the direction of running, and means for indicating danger, safety, and non-working conditions of such controlling means.

45. The combination with a pair of traffic rails divided into blocks, of means for automatically controlling the power, brake, or other movement-controlling medium of a vehicle traveling thereon from either end of a block in accordance with the direction of running, and means for recording danger, safety and non-working conditions of such recording means.

46. The combination with a pair of traffic rails divided into blocks, of a pair of controlling means each of which governs the other, and one of which governs the power, brake, or other movement-controlling medium of a vehicle or train from either end of a block in accordance with the direction of running, and the other of which governs a semaphore or similar signal from either end of the block in accordance with the direction of running.

47. The combination with a pair of traffic rails divided into blocks, of a semaphore or similar signal at each end of a block, and controlling means governing the power, brake, or other movement-controlling medium of a vehicle or train from either end of the block in accordance with the direction of running and governed by said signals respectively in accordance with the direction of running.

48. The combination with a pair of traffic rails divided into blocks, of a pair of controlling means, one of which embodies a signal at each end of a block, and the other of which embodies means for governing the power, brake, or other movement-controlling medium of a vehicle or train from either end of the block in accordance with the direction of running, and means for simultaneously establishing a danger condition in both of said controlling means at the same end of the block.

49. The combination with a pair of traffic rails divided into blocks, of two pairs of electric circuits, the circuits of one pair governing respectively a pair of semaphores or similar signals at opposite ends of a block, and the circuits of the other pair governing the power, brake, or other movement-controlling medium of a vehicle or train from opposite ends of the block in accordance with the direction of running, and means for simultaneously establishing a danger condition in dissimilar circuits at either end of the block.

50. The combination with a power-operated vehicle having a partial electric circuit and a contact member, of power-controlling means, localized means for supplying current to said circuit, a separate signal circuit including an electric switch governed by said power-controlling means, and a visual signal controlled by said electric switch.

51. The combination with a power-operated vehicle having a partial electric circuit and a contact member, of power-controlling means, a separate normal danger block-signal circuit including an electric switch governed by said power-controlling means, and a visual signal controlled by said electric switch.

52. The combination with a pair of track circuits each including a track contact, of a vehicle having a controlling circuit for governing the power, brake or other movement-controlling medium, a pair of contact members, and means for connecting one or the other of said contact members in said controlling circuit in accordance with the direction of movement of the vehicle.

53. The combination with a pair of track contacts, of a vehicle having a pair of contact members, automatic means including an electric circuit for controlling the power, brake, or other movement-controlling medium for said vehicle, and means for connecting one or the other of said contact members in said circuit in accordance with the direction of movement of the vehicle.

54. The combination with a vehicle having a pair of controlling members adapted to be brought into and put out of action in accordance with the direction of travel of the vehicle, of means coöperative with said controlling members for automatically governing the power, brake, or other movement controlling medium for said vehicle.

55. The combination with a vehicle having a pair of contact members, of means including an electric circuit for automatically governing the power, brake, or other movement-controlling medium for said vehicle, and means for connecting one or the other of said contact members in said circuit in accordance with the direction of travel o the vehicle.

56. The combination with a single-track block-signal system, of a vehicle moving along said track and having a pair of controlling members adapted to be brought into and put out of action in accordance with the direction of travel of the vehicle, and means coöperative with said controlling members, and working in harmony with the signals of said signal system, and including localized power-supplying means for automatically governing the power, brake, or other movement-controlling medium for said vehicle.

57. The combination with a single-track block-signal system, of a vehicle movable along said track and having a pair of contact members, means including an electric circuit and localized current-supplying means, and working in harmony with the signals of said signal system, for automatically governing the power, brake, or other movement-controlling medium for said vehicle, and means for connecting one or the other of said contact members in said circuit in accordance with the direction of travel of the vehicle.

Signed at New York, in the county of New York, and State of New York, this 4th day of October, A. D. 1905.

FRANK E. KINSMAN.

Witnesses:
 EDGAR A. FELLOWS,
 C. S. CHAMPION.